(12) United States Patent
MacNeil

(10) Patent No.: US 9,162,651 B2
(45) Date of Patent: Oct. 20, 2015

(54) VEHICLE WASH SYSTEM WITH BEAM SYSTEM

(75) Inventor: Daniel J. MacNeil, Barrie (CA)

(73) Assignee: Ryko Canada, Inc., Grimes, IA (US)

( * ) Notice: Subject to any disclaimer, the term of this patent is extended or adjusted under 35 U.S.C. 154(b) by 0 days.

(21) Appl. No.: 13/011,143

(22) Filed: Jan. 21, 2011

(65) Prior Publication Data

US 2011/0284030 A1  Nov. 24, 2011

Related U.S. Application Data

(60) Provisional application No. 61/297,554, filed on Jan. 22, 2010.

(51) Int. Cl.
*B60S 3/04* (2006.01)

(52) U.S. Cl.
CPC .......................................... *B60S 3/04* (2013.01)

(58) Field of Classification Search
CPC ......................................................... B60S 3/04
USPC ......................................................... 134/123
See application file for complete search history.

(56) References Cited

U.S. PATENT DOCUMENTS

| | | | |
|---|---|---|---|
| 4,798,217 A * | 1/1989 | Hanna | 134/57 R |
| 4,946,513 A | 8/1990 | Del Prato et al. | |
| 2004/0069328 A1* | 4/2004 | Lin | 134/45 |

* cited by examiner

*Primary Examiner* — Jason Ko
(74) *Attorney, Agent, or Firm* — Smart & Biggar

(57) ABSTRACT

A vehicle wash system is disclosed that has a vehicle path for movement of a vehicle. The system comprises a support frame, a first beam member mounted to the support frame and a second beam member mounted to the support frame for vertical movement relative to the support frame. The second beam member is spaced from the first beam member. The first and second beam members each have associated therewith a vehicle treatment apparatus. Each of the first beam member and second beam member are movable between (a) operational positions wherein first and second beam members extend across the vehicle path and the treatment apparatus is operable to apply a treatment to a vehicle on the vehicle path and (b) vehicle release positions wherein the beam members do not extend across the vehicle path.

22 Claims, 14 Drawing Sheets

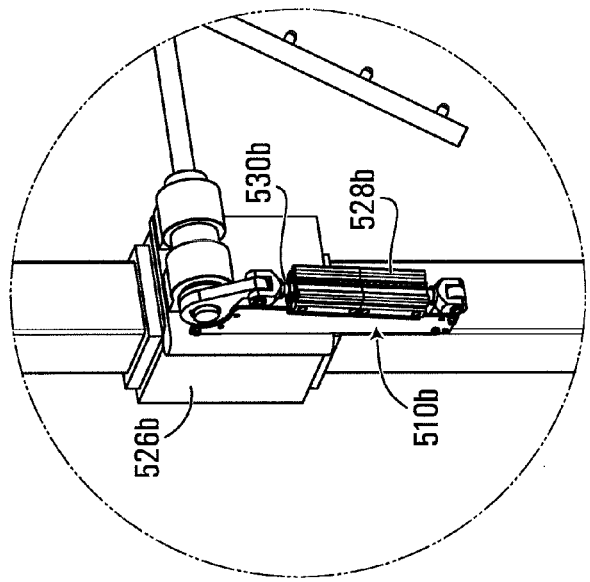
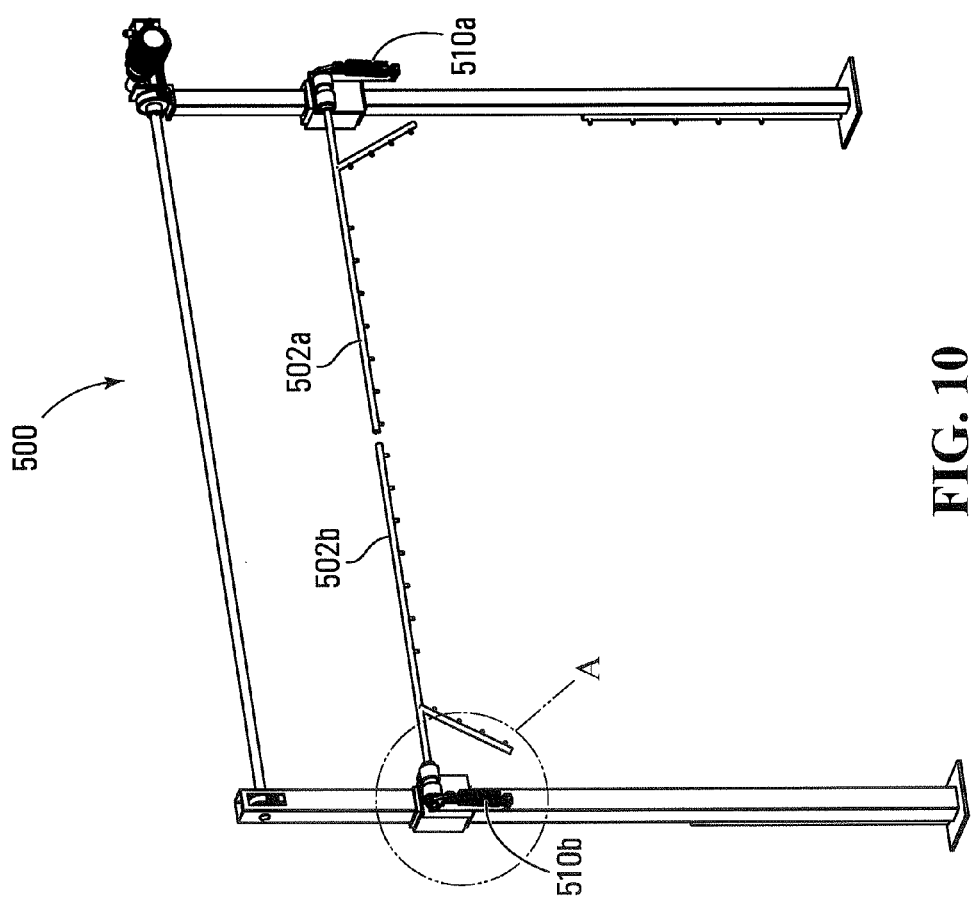
FIG. 10A
FIG. 10

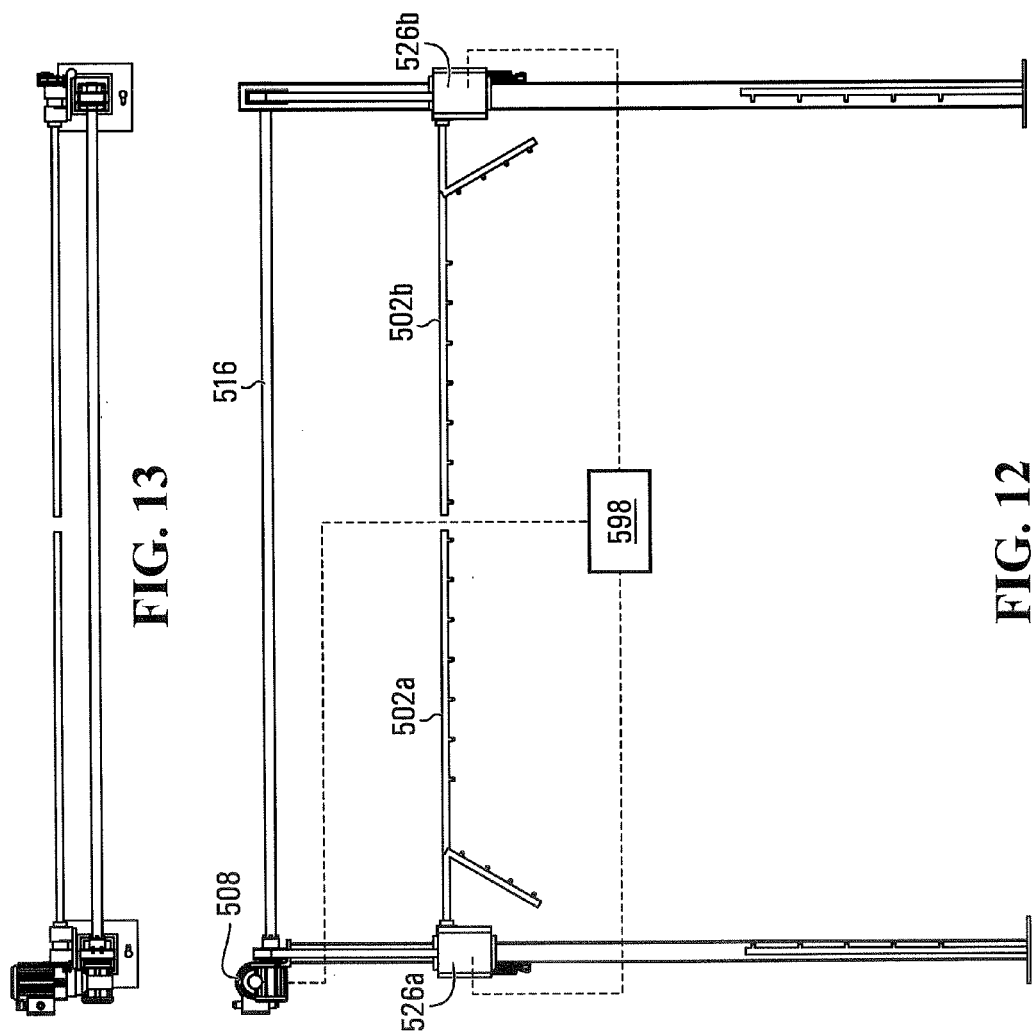

VEHICLE WASH SYSTEM WITH BEAM SYSTEM

CROSS-REFERENCE TO RELATED APPLICATION

This application claims priority from U.S. provisional application No. 61/297,554, filed Jan. 22, 2010, the contents of which are hereby incorporated herein by reference.

FIELD OF THE INVENTION

The present invention relates generally to vehicle wash systems.

BACKGROUND OF THE INVENTION

Vehicle wash systems of various types are well known. Vehicle wash systems may include one or more stations where various treatment steps are performed on a vehicle. Treatment steps that may be provided to a vehicle include: (i) applying a pre-soaking liquid to the vehicle typically consisting of a mixture of water and soap/detergent to start to loosen the dirt; (ii) applying additional soap and water and engaging brushes/cleaning pads with, and/or the directing high pressure fluid streams onto, the exterior of the vehicle to remove the dirt; (iii) optionally applying waxes, undercoating fluids, tire cleaning and finishing fluids; (iv) rinsing the exterior surfaces by step directing high pressure streams of clean water onto the vehicle exterior surfaces to remove residue left after the cleaning step; and (v) drying the exterior surfaces by directing high pressure streams of air, typically at a temperature above ambient air temperature, onto the exterior surfaces of the vehicle to remove at least some of the remaining residue of water left over from the rinse step.

In some types of vehicle wash systems a vehicle is conveyed on a conveyor through a series of stations where apparatuses are provided to carry out each of the foregoing steps. In other vehicle wash systems a vehicle may be self-driven by a driver through such a series of stations. In some other systems, a vehicle is moved into a first location where, while the vehicle remains stationary, several of the steps are performed by utilizing one or more apparatuses that may have components that move relative to the vehicle. Thereafter, the vehicle may be moved from the first location and may pass through one or more additional stations where one or more additional steps may be carried out.

At some of the stations in a vehicle wash systems, components of the apparatuses that are used to carry out certain treatment steps include a transversely oriented and extending beam that is generally oriented perpendicular to the longitudinal orientation and direction of movement of the vehicle. Such a beam may house and/or support devices such as air exhaust vents and fluid nozzles. Thus, pressurized air and/or fluid streams can be directed through the vents and/or nozzles onto the exterior surfaces of the vehicle that is being washed.

The beams carrying the devices and vents/nozzles may be mounted for movement relative to the exterior surfaces of the vehicle. The beams may be mounted only for substantially vertical movement or mounted for both vertical and horizontal movement. A sensor and movement control system may be provided that enables the beam to closely track and follow the profile and contour of the exterior surfaces of the vehicle as the surface position changes so as to maintain the beam at a specific distance from the exterior surfaces, or at least within a range of distances separated from the exterior surfaces. An example of a sensor system that might be employed as part of such a system is an electronic eye that is mounted to the beam and has a transverse electronic beam that is separated from the beam itself and the devices and vents supported thereon. By a feedback loop program in a PLC, the PLC can upon receipt of signals from the electronic eye device move the beam relative to the exterior surface of the vehicle to maintain the separation from the exterior surfaces.

In another system, as disclosed in U.S. Pat. No. 4,946,513 issued to Del Prato et. al, on Aug. 7, 1990, the entire contents of which are hereby incorporated herein by reference, an array of beams and sensors by which a vehicle passes by can determine the profile of the vehicle prior to it entering the treatment station(s). The profile is stored in the system and used to control the position of a spray bar. An additional sensor system attached to the spray is also disclosed in Del Prato et. al and that is used to direct the system to move the spray bar in the event that the spray bar gets too close to the exterior surface of the vehicle. The Del Prato et al. reference also discloses a cushioning member mounted to the spray bar that is the first point of contact between the spray bar and an exterior surface of a vehicle. If the vehicle exterior surface and spray bar come too close to each other, the cushioned member will first touch the exterior surface of the vehicle. Pressure on the cushioning member causes the spray bar to pivot around a swivel member, causing actuation of a switch which stops the system. The cushioning effect on the cushioning member prevents damage to the vehicle. The swiveling motion of the spray bar prevents damage to the wash system.

In some wash systems, the amount of pivoting of the spray bar or other beam carrying treatment devices, in cases of system malfunction, is sufficiently large enough to allow the vehicle to proceed out of the wash system. In this way, if the system malfunctions, the vehicle and its occupants are not stuck in the wash system until the system failure can be rectified. Rather the vehicle can leave the vehicle wash system without undue delay. It will however, be appreciated that as the spray bar or other beam member is relatively long to be able to transversely cover the width of all vehicles using the wash system, when the beam pivots sufficiently to allow the vehicle to exit the wash system, its position will move from being transversely oriented to being longitudinally oriented. This will require a significant amount of longitudinal space to be left open to permit this full pivoting movement that is required.

As it is desirable to reduce the footprint of car wash systems, an improved beam release system would be beneficial.

SUMMARY OF THE INVENTION

In accordance with an aspect of the present invention, there is provided a vehicle wash system comprising: a vehicle path for movement of a vehicle; a support frame; a first beam member mounted to the support frame a second beam member mounted to the support frame for vertical movement relative to the support frame, the second beam member being spaced from the first beam member; the first and second beam members each having associated therewith a vehicle treatment apparatus; each of the first beam member and the second beam member being movable between (a) operational positions wherein first and second beam members extend across the vehicle path and the treatment apparatus is operable to apply a treatment to a vehicle on the vehicle path and (b) vehicle release positions wherein the beam members do not extend across the vehicle path.

In accordance with another aspect of the present invention, there is provided a vehicle wash system comprising: a vehicle path for movement of a vehicle; a support frame; a first beam member mounted to the support frame; a second beam member mounted to the support; the first beam member and the second beam member extending from opposite transverse sides of the vehicle path; the first and second beam members each having associated therewith a vehicle treatment apparatus; each of the first beam member and the second beam member being movable between (a) operational positions wherein first and second beam members are generally longitudinally oriented in a direction that is perpendicular to the vehicle path and (b) vehicle release positions wherein the beam members are generally longitudinally oriented in a direction that is parallel to the vehicle path.

In accordance with yet another aspect of the present invention, there is provided a method of washing a vehicle in a vehicle wash system comprising: providing a vehicle in a treatment station, the vehicle being movable in a longitudinal direction; applying a treatment to the vehicle while the vehicle is in the treatment station with treatment being provided from a treatment apparatus associated with a first beam member and a second beam, the first and second beam members being generally axially aligned with each other and being oriented in operational positions; detecting a signal; in response to the signal, activating a beam member movement/rotation apparatus to move/rotate the first and second beam members from the operational positions to vehicle release positions wherein the wherein the first and second beam members are no longer generally axially aligned with each other and are generally oriented in the longitudinal direction.

In accordance with yet another aspect of the present invention, there is provided a system of washing a vehicle in a vehicle wash system comprising: a treatment apparatus mounted to a first beam member and a second beam, the first and second beam members being generally oriented in operational positions that are transversely across a vehicle path when applying a treatment to a vehicle; a detector for detecting a signal; a beam member movement/rotation apparatus to move/rotate the first and second beam members from the operational positions to vehicle release positions wherein the first and second beam members are no longer generally axially with each other and are generally oriented in said longitudinal direction; and a PLC operable to receive the signal from the detector and in response thereto, to activate the a beam member movement/rotation apparatus to move/rotate the first and second beam members from the operational positions to vehicle release positions.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention:

FIG. 10 is a rear right side perspective view of a beam system in accordance with another embodiment;

FIG. 10A is an enlarged view of the portion marked A in FIG. 10;

FIG. 12 is a front elevation view of the beam system of FIG. 10;

FIG. 13 is a top plan view of the beam system of FIG. 10;

FIG. 14 is right side elevation view of the beam system of FIG. 10;

DETAILED DESCRIPTION

Air blowers connected to vents may be used in the drying station of a vehicle wash system. In both conveyor/tunnel-type wash systems where the vehicle moves through various treatment stations, and in "roll-over" type vehicle wash systems where the vehicle remains stationary at a station during at least some of the treatments, the drying station may be located just before the vehicle exits the wash system. The drying station of a wash system may be comprised of one or more air blowers providing pressurized air to vents mounted on a frame. The air blowers may be employed to dry the vehicles by forcing a stream of pressurized air through the vents onto and over the surface of the vehicle. The streams of air may also be heated above ambient temperature. The operation of blowers in vehicle wash systems may be controlled by a programmable logic controller (PLC). To conserve power, a relatively simple controller can be provided that is operable to switch the supply of power to the motor on and off, depending upon whether or not a vehicle is in the drying section of the vehicle wash system. The presence of a vehicle in the drying section can be detected by a known type of sensor.

Figure 1:
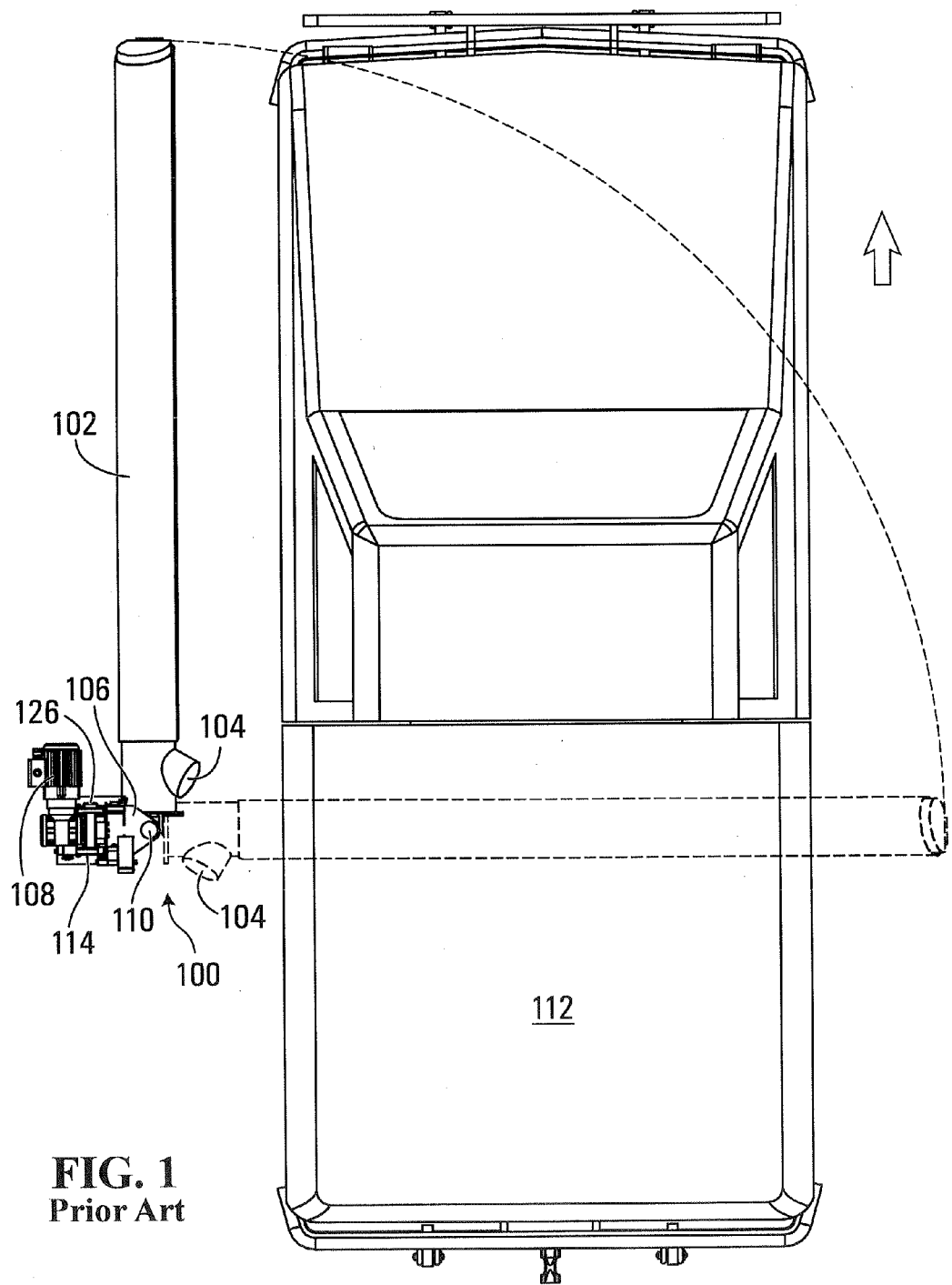
FIG. 1 is a top plan view of a beam system for a dryer station.

With reference to FIG. 1, a beam system 100 is illustrated that may form part of a drying station in a car wash system. Beam system 100 may have a beam 102 mounted to a support frame 106 that may include a single support post 114. Beam 102 may supported on a support block 126 that may be moved vertically up and down on support post 114. Support block 126 may be moved vertically up and down by a support block drive apparatus, like the support block drive apparatus described below. The support block drive apparatus may be driven by a servo-motor 108 like the servo-motor described below. Motor 108 may be controlled by a programmable logic controller (PLC) not shown in FIG. 1. Beam 102 may be configured as a hollow tube and have vents provided in a bottom surface of the hollow tube (not shown) and an air intake duct 104. Pressurized air may be supplied from a source such as a blower, through intake duct 104 into the interior of the hollow tube of beam 102. The pressurized air in the beam 102 may be at a temperature above ambient temperature and may be directed through the vents in beam 102 in air streams onto the exterior surface of a vehicle 112 to remove water on the surface. Beam 102 may be mounted to support frame 106 at a hinge 110 and be capable of pivoting motion. A beam member rotation apparatus may be provided to cause the beam member to rotate. Thus as depicted in broken lines in FIG. 1, beam 102 may pivot between an operational position shown in broken lines and a vehicle release position shown in solid lines.

Figure 2:
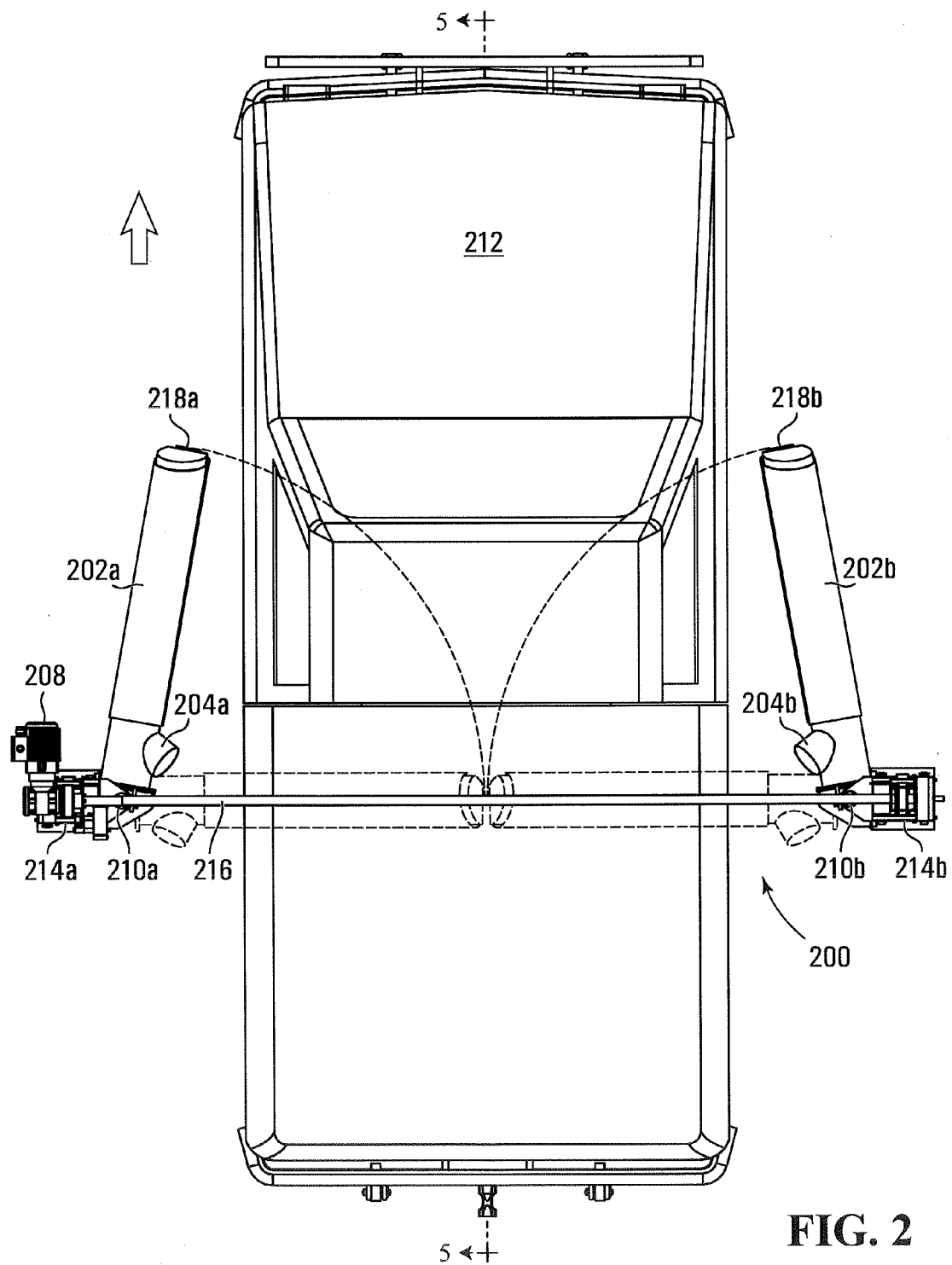
FIG. 2 is a top plan view of an alternate beam system for a dryer station.
Figure 4:
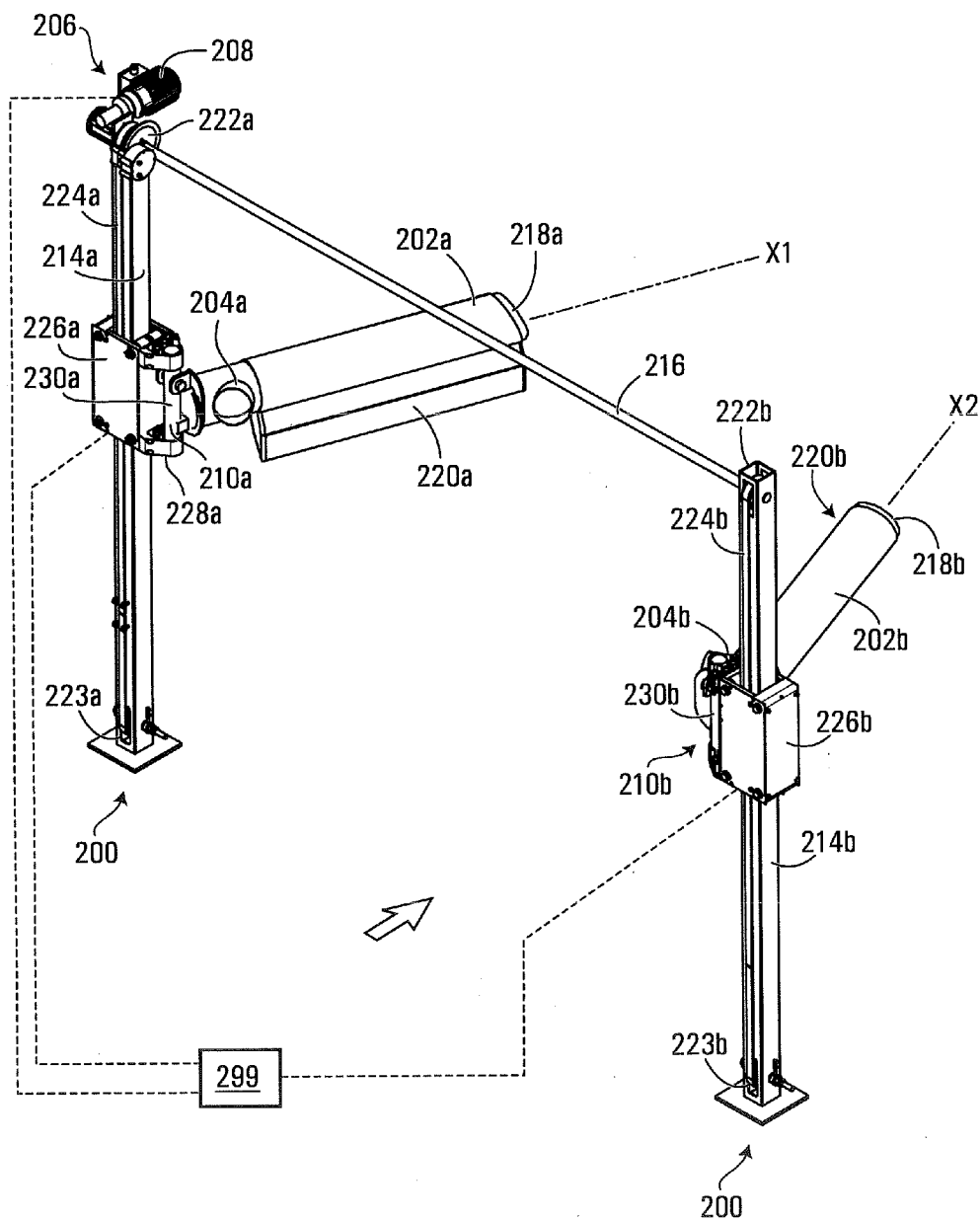
FIG. 4 is a rear right side perspective view of the beam system of FIG. 2.

With reference now to FIGS. 2 and 4, an alternate beam system 200 is illustrated that may form part of a drying station in a car wash system. A vehicle path 101 (FIG. 4) is provided through the beam system 200. Beam system 200 may have a pair of beam members 202a, 202b, each of which may be mounted to a support frame generally designated as 206. Support frame 206 may include a first support post 214a separated transversely from, but longitudinally aligned with, a second support post 214b. Beam member 202a may be mounted for vertical movement on support post 214a; likewise beam member 202b may be mounted for vertical movement on support post 214b.

Figure 4A:
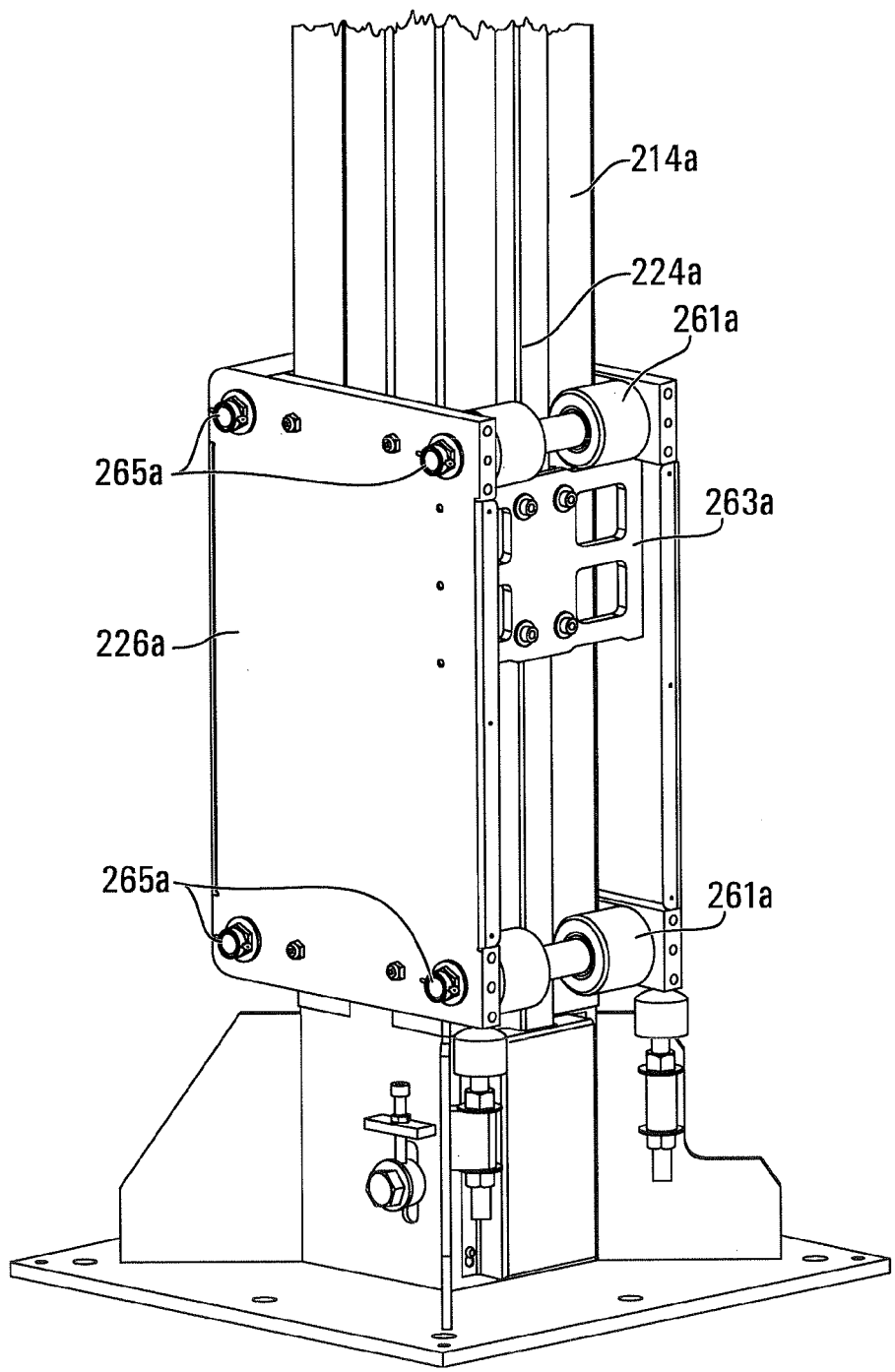
FIG. 4A is an enlarged perspective view of part of the system of FIG. 2.

Beam member 202a may be mounted at one end to support frame 206 with a support block 226a. Support block 226a may be comprised of a plurality of plates surrounding the support post 214a. With particular reference to FIG. 4A that for clarity shows only the support block attached to the support post, the support block 226a may be mounted around post 214a for vertical sliding movement relative to post 214a. This vertical sliding movement may be achieved for example by providing for rods 265a to connect the plates forming the support block. The rods 265a may pass through rollers 261a which travel along the front and rear faces of post 214a. The side plates of support block 226a may also be provided with small guide rollers (not shown) to facilitate sliding movement. Of course other types of sliding connections may be provided. The drive belt 224a may be connected to the support block 226a with a connecting plate 263a. Support block 226b may be connected in the same manner has support block 226a.

Beam member 202a may be attached to support block 226a at a hinge 210a comprising a vertically oriented shaft 230a held at either end in bearings 228a that are attached to the support block 226a.

Likewise, beam member 202b may be mounted at one end to support frame 206 with a support block 226b. Support block 226b may be comprised of a plurality of plates surrounding the support post 214b. Support block 226b may be mounted around post 214b for vertical sliding movement relative to post 214b. The vertical sliding movement of support block 226b on support post 214b, may also be as described above in relation to support block 226a moving on support post 214a. Beam member 202b may be attached to support block 226b at a hinge 210b comprising a vertically oriented shaft 230b held at either end by bearings 228b that are secured to the support block 226b.

Each of the beam members 202a, 202b may also be mounted for rotation about a longitudinal axis X1, X2 respectively. While the drive mechanism for rotation about these axes is not shown, it will be appreciated that a rotating annular connection may be provided between a portion of beam member 205a that is mounted to hinge 210a, and the remaining portion of beam member 202a. The remaining portion of beam member 202a may be rotationally driven relative to beam member portion 205a. The drive mechanism may also be controlled by PLC 299. The drive mechanism may include a pneumatic solenoid valve that controls the flow of pressurized air to one more pneumatic cylinders. The same arrangement may be provided for beam member 202b.

As depicted in broken lines in FIG. 2, beam members 202a and 202b may also pivot at hinges 210a and 210b respectively between the operational positions shown in broken lines (where the beam members extend across the vehicle path) and the vehicle release positions shown in solid lines (where the beam members do not extend across the vehicle path and are oriented generally longitudinally in the direction of the vehicle path). It will be noted that in the operational positions the beam members are substantially aligned along a common transverse axis.

In some beam systems, beam members 202a, 202b may be provided with a spring bias mechanism that would bias the beam members to the operational positions. For example a spring for each beam member might have opposite ends interconnected to the beam member and to the support block and may be positioned proximate a pneumatic cylinder 279a, 279b. The bias towards the vehicle release position could be overcome with only a small force applied by a vehicle moving past the beam members. In some other systems, a beam member rotation apparatus may be provided for each of beam members 202a, 202b that is operable to positively move both of the beam members in both rotational directions between the operational positions and the release positions shown in FIG. 2. By way of example, a pneumatic cylinder 279a, 279b supplied with pressurized air from a suitable source, may be provided for beam members 202a, 202b respectively. The pneumatic cylinders may interconnect the beam members 202a, 202b to their respective support blocks 226a, 226b. Pneumatic cylinder may provide positive action only in one direction when rotating from the vehicle release position to the vehicle operational position. The cylinders act on the beam members 202a, 202b to keep the beam members in the operational positions. A spring mechanism could be provided to bias the beam members to the vehicle release positions, and that spring bias could be overcome by the cylinders when the cylinders move the beam members to the operational positions and keep the beam members at those positions. Thus the positive action/force exerted to keep the beam members in the operational positions provided by the pneumatic cylinder can be released when it is necessary to deactivate the beam system and release the vehicle. Thus there may be a bias provided toward the open or vehicle release positions provided by a spring mechanism, with active motivation required to move the beam members towards the closed or operative positions. Thus a single acting spring return air cylinder would be suitable. The pneumatic cylinder's operation may be controlled by a PLC. In another system, a two way acting pneumatic cylinder may be provided that would positively move the beam members 202a, 202b in both rotational directions between the vehicle release and operational positions.

At the distal end of each beam member 202a, 202b, beam connectors 218a, 218b may be provided. Beam connectors 218a, 218b may be used with or without the beam rotation apparatus referred to above. Beam connectors 218a, 218b are operable to interconnect with, and disconnect from, each other to provide a releasable connection between the distal ends of the beam members 202a, 202b. The beam connectors 218a, 218b, may be self engaging devices, such as for example by attracting electro-magnets that may supplied with electricity from a source of electricity and which be activated and de-activated by signals provided by PLC 199. In other systems beam connectors 218a, 218b may constitute a mechanical resilient and releasable latch mechanism whereby one beam member will have a rod member that may be releasably received in a slot made from resilient members to provide for a releasable connection.

The operation of beam connectors 218a, 218b may also be controlled by a PLC 199 (only shown in FIG. 4). PLC 199 may be a model CP1L-M40DR-D made by Omron Corporation. It should be noted that PLC 199 may be configured to control all aspects of the beam system, and in fact of the entire drying station.

A motor 208, which may be an electric motor (such as for example motor model SCAQ26-QH80M4U made by Siemens Canada Limited) may be mounted to post 214a of support frame 206 and may be configured and be operable to drive a support block drive mechanism. Support block drive mechanism may include upper pulleys 222a, 222b, lower pulleys 223a, 223b, and a transversely oriented drive rod 216. Drive rod 216 may be interconnected at ends to drive pulleys 222a, 222b and rotate with those pulleys. Pulleys 222a and 223a are interconnected by a drive belt 224a and pulleys 222b and 223b are interconnected by a drive belt 224b. Drive belt 224a is connected to support block 226a and drive belt 224b is connected to support block 226b. Motor 208 is operatively connected to drive rod 216 to rotate drive rod 216 in both directions. Thus, operation of motor 208 may cause drive rod 216 to rotate which may cause drive pulleys 222a, 222b to rotate, rotating pulleys 223a, 223b and causing drive belts 224a, 224b to move.

As support block 226a is attached to both drive belt 224a and beam member 202a, movement of drive belt 224a will cause support block 226a on post 214a and beam member 202a attached to support block 226a to move vertically on support post 214a. Likewise, as support block 226b is attached to both drive belt 224b and beam member 202b, movement of drive belt 224b will cause support block support 226b on post 214b and beam member 202b attached to support block 226b to move vertically on support post 214a. The positioning of beam members 202a and 202b and their support blocks along with the drive mechanism for the support blocks may be configured so that they both move vertically up and down together and in vertical alignment on their respective support posts 214a, 214b.

Motor 208 may be controlled by PLC 199. Each pivoting beam member 202a, 202b may be oriented generally horizontally configured as or support, a treatment dispenser/treatment apparatus. In this system 200, each beam member 202a, 202b acts as a pressurized air dispenser as it is formed as a hollow tube and has vents 220a, 220b that extend along at least a portion of the full length of beam members 202a, 202b respectively provided in bottom surfaces of the hollow tubes, as well as intake ducts 204a, 204b. Pressurized air may be supplied from a source such a blower (not shown in FIGS. 2 and 4), into the interior of the hollow tube of beam members 202a, 202b. As each of the beam members 202a, 202b may be mounted for rotation about their respective longitudinal axis X1, X2 the rotational positions of vents 220a of beam member 202a and the rotational positions of vents 220b of beam member 202b may be adjusted by the rotational drive mechanism. PLC can adjust the orientation of the vents depending upon where the vehicle is in a longitudinal position relative to the beam members 202a, 202b. This may be done based on a determination of the shape of the vehicle via photo eye(s) system and/or available information about the position of the vehicle in a manner that is known.

A sensor and movement control system may be provided that enables each of the beam members 202a, 202b, to closely track and follow the profile/contour of the exterior surfaces of the vehicle 212 as the surface position changes so as to maintain the beam members at a specific distance from the exterior surfaces, or at least within a range of distances separated from the exterior surfaces. An example of a sensor system that might be employed as part of such a system is an electronic eye system that may be mounted to the beam members. In some systems the electronic eye system may have components that are also or alternatively mounted to the support blocks. By mounting components of the electronic eye system to the support blocks 226a, 226b, the electronic eye system may provide information about the presence or lack of presence of a vehicle at the station during the vehicle release condition. If this information is not used by the PLC 199 or is available externally then mounting the electronic eye components to the beam members 202a, 202b allows the condition required for the vehicle release position to be differentiated from the condition required for the operational positions without an additional sensor e.g. limit switch(es). The electronic eye system may provide a transverse electronic beam that is vertically, and possibly also longitudinally, separated from the beam members 202a, 202b, and the devices and vents supported thereon. A photo-source and photo-detector may be configured in a circuit to provide the electronic eye, such that a beam like beam 459 in FIG. 4, may be transmitted by the photo-source and received by the photo-detector, as is known. Examples of suitable photo-source and photo-detector devices that may be employed are the model IR 110-2 made by MacNeil Wash Systems. If no object is present to interrupt electronic beam, the electronic beam is said to be in the received state. If an object is positioned to prevent transmission of the electronic beam from the photo-source to the photo-detector, the electronic beam is said to be in the interrupted state. Signals corresponding to the received and interrupted states can be transmitted on an ongoing basis to a PLC. By virtue for example of a known type of feedback loop program in PLC 199, the PLC can upon receipt of signals from the electronic eye system operate the beam movement apparatus to move the beam members relative to the exterior surface of the vehicle to attempt to maintain the desired separation from the exterior surfaces.

Various devices/system may used to detect a signal that indicates that there is a problem with the drying system and trigger the PLC 199 to respond to move the beam members 202a, 202b from the operational positions to the vehicle release positions. By way of example only, limit switches at the beam hinge points or at the beam couplings can be provided to provide a signal that indicates some kind of initial departure of the beam members from the operative positions. The PLC 199 may also respond to a signal from a timer to detect failure of the positioning beam member positioning system to respond to the interruption of the photo eye(s). PLC 199 may also respond to signals emitted from detectors in the system that there has been a system power failure and/or loss of pneumatic air supply, or from a pressure sensor to detect the absence of the delivered fluid. A cushion device such as disclosed in U.S. Pat. No. 4,946,513 issued to Del Prato et. al, on Aug. 7, 1990 may also be used to provide a signal to PLC 199 to activate the beam rotation system.

In some beam release systems, the beam members may be moved from the operational positions to the vehicle release positions in response to signals that detect states other than when responding to a system problem or alarm signal. By way of example only, the beam members may be moved to the vehicle release positions when the PLC 199 receives a signal from a sensor that detects when a treatment is completed. Alternatively the PLC 199 program during operation when it reaches a stage that relates to when the treatment is over may activate the beam rotation system. The beam members may for example be also be moved from the operational positions to the vehicle release positions in response to signals from other parts of the wash system e.g. a signal indicating a critical failure of an external wash component or in response to a signal initiated by an operator of the vehicle wash system. In this way, the operator may initiate movement of the beam members from the operational positions to the vehicle release positions for servicing the wash equipment or cleaning the floor in a station such as the dryer station.

In operation, pressurized air may be supplied through intake ducts 204a, 204b into the beam members 202a, 202b at a temperature above ambient temperature through ducts and from air blowers (not shown). The pressurized air may then be directed in streams out of the beam members through the vents in beam members 202a, 202b including vents 220a, 220b, onto the exterior surface of a vehicle 212 to remove liquid such as water thereon.

Figure 5:
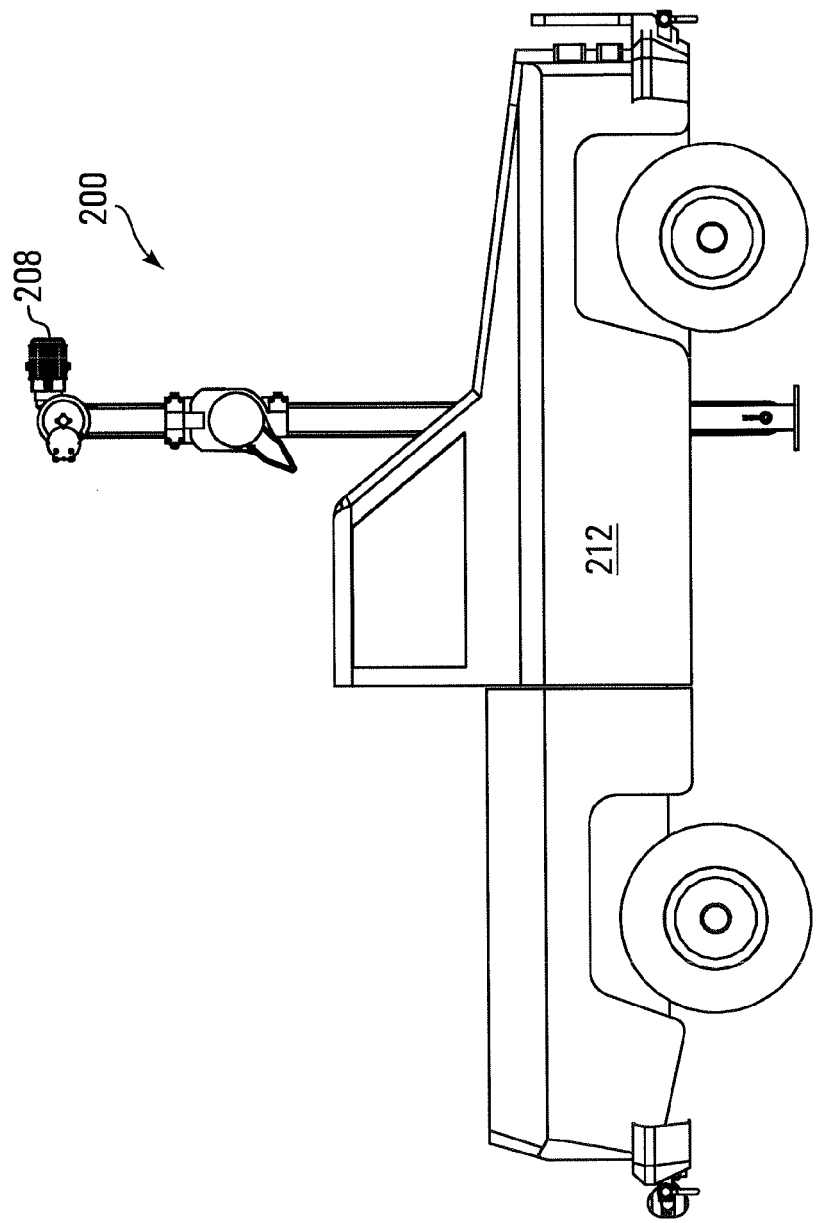
FIG. 5 is a right side elevation view of the beam system of FIG. 2 at section 5-5, illustrating schematically various positions and orientation of a beam member in the beam system of FIG. 2.
Figure 6:
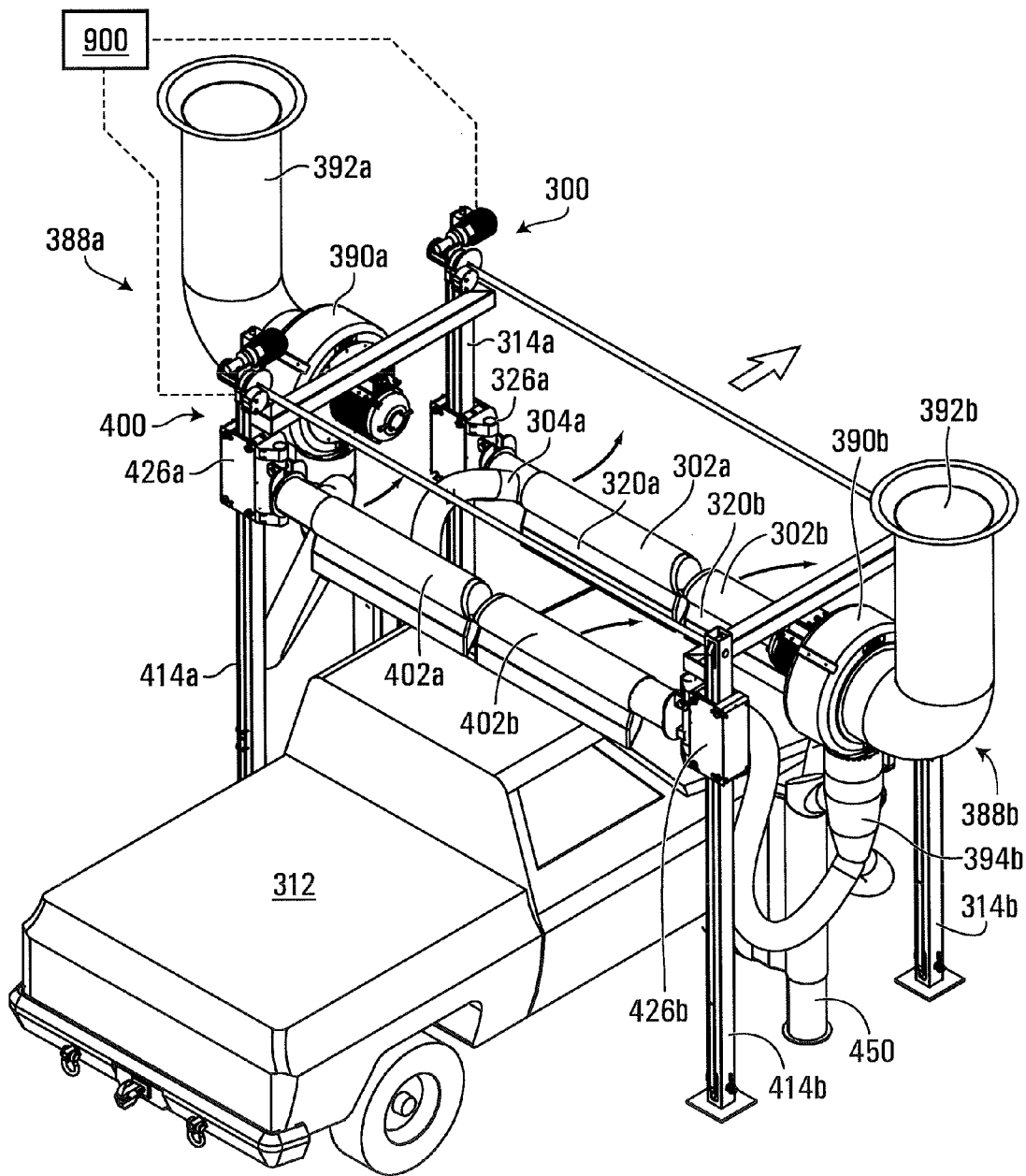
FIG. 6 is a rear right perspective view of a drying station in accordance with an example embodiment.
Figure 7:
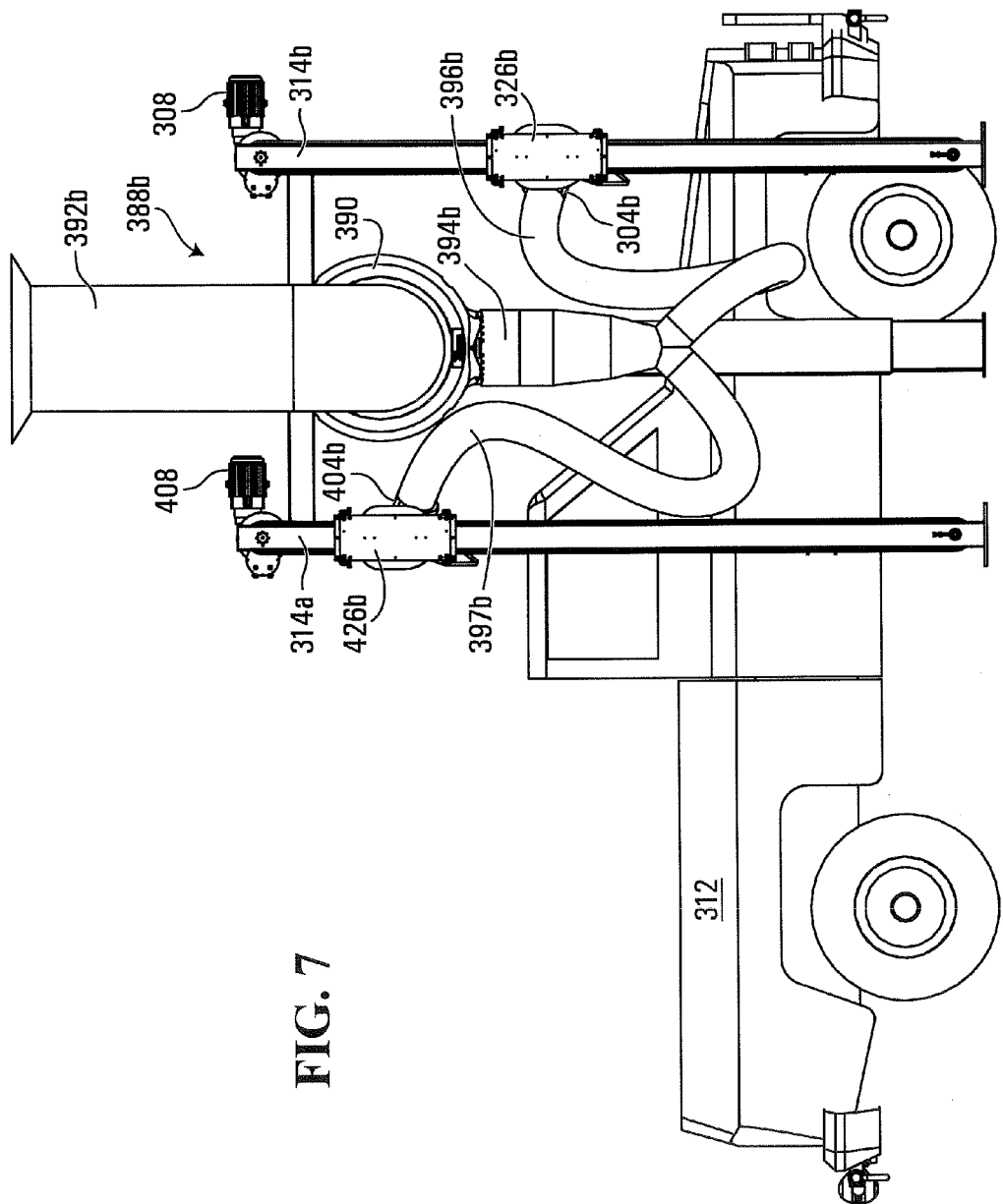
FIG. 7 is a right side elevation view of the drying station of FIG. 6.
Figure 8:
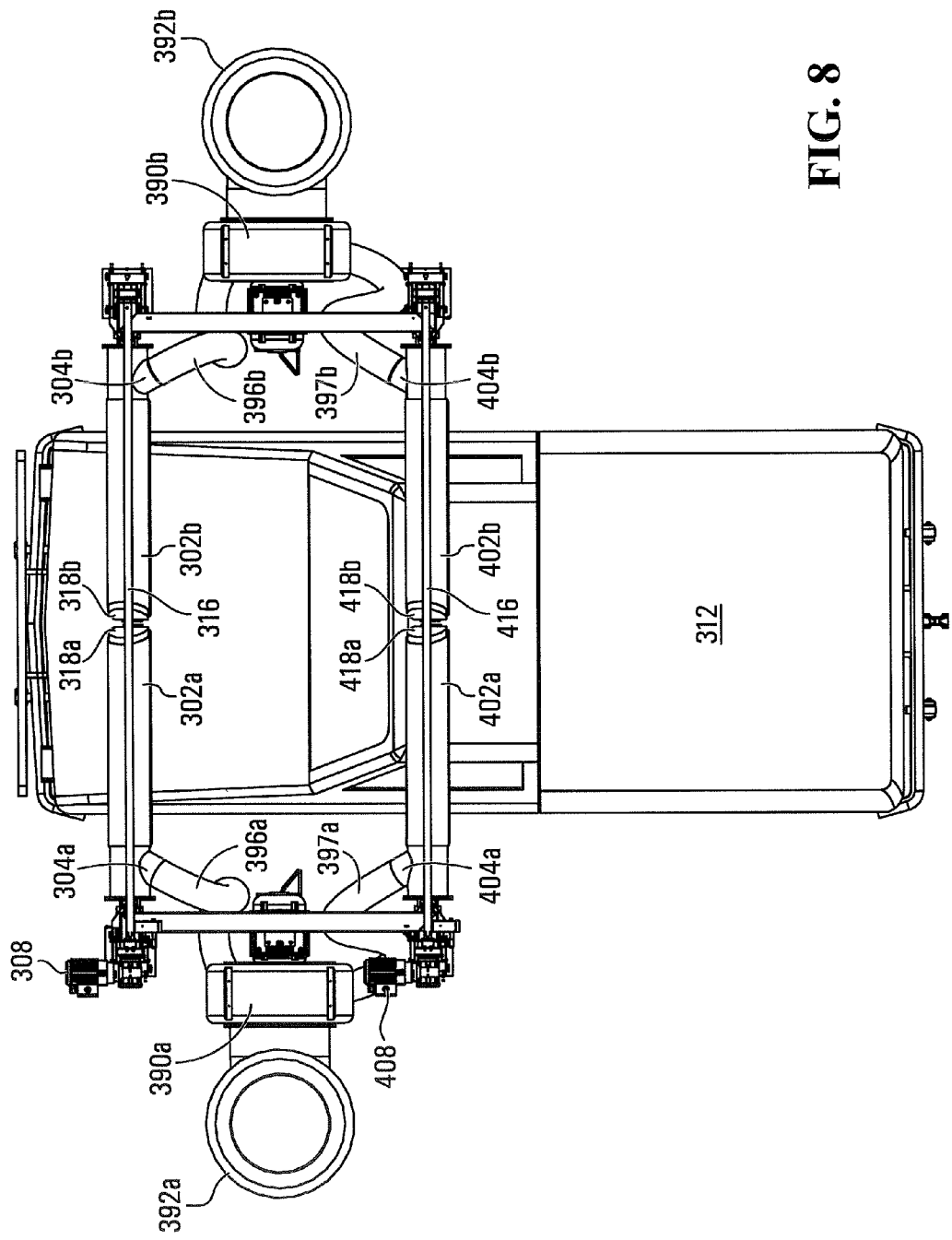
FIG. 8 is a top plan view of the drying station of FIG. 6.
Figure 9:
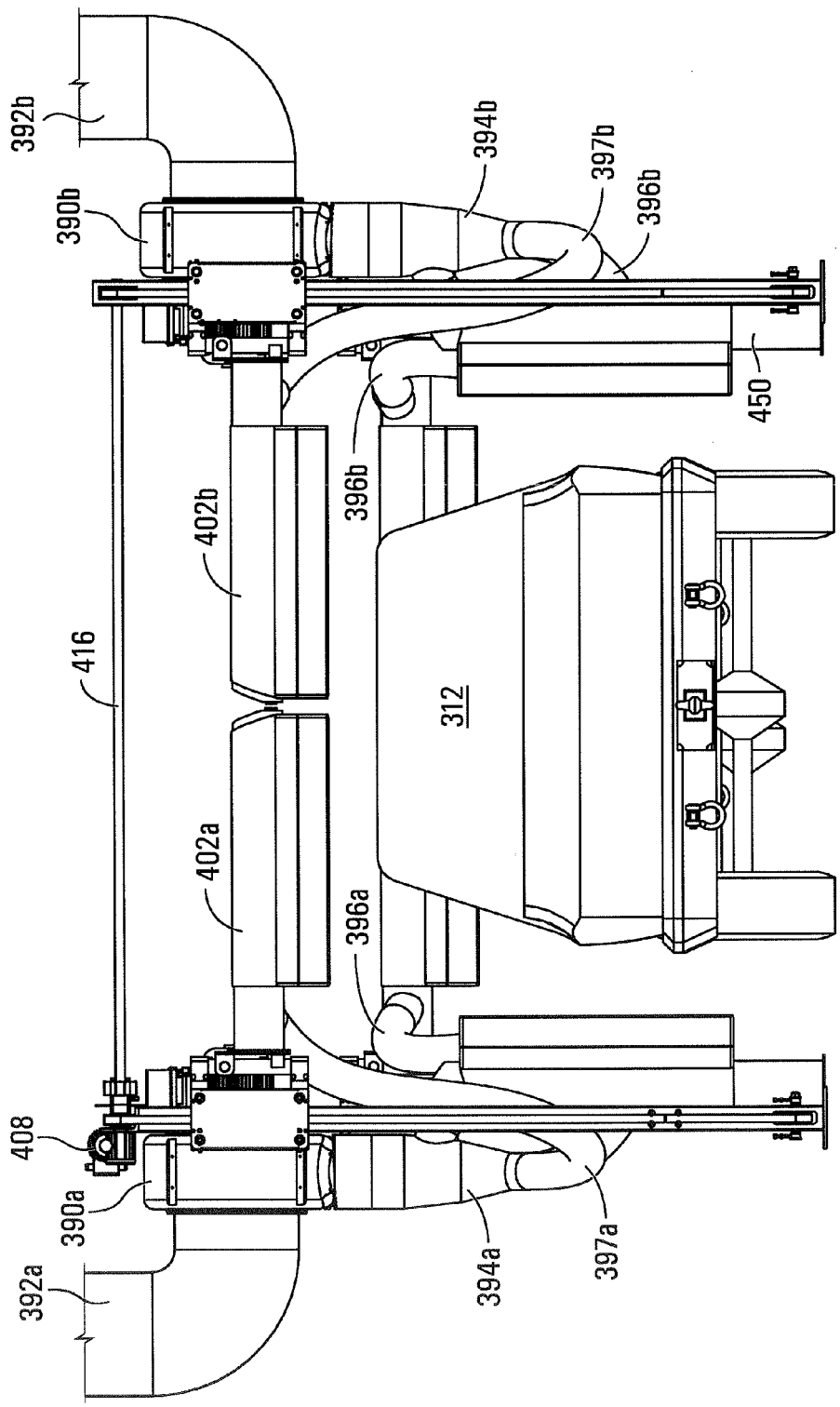
FIG. 9 is a rear elevation view of the drying station of FIG. 6.

Vehicle 212 may be moved through the drying station and during normal operation. The PLC 199, receiving signals from the electronic eye system, may operate the support block movement apparatus to control the vertical position of beam members 202a, 202b and the orientation of the vents including vents 220a, 220b. The beam members may during the drying of the vehicle be in their operational positions shown in broken lines in FIG. 2. When positioned in the operational positions beam connectors 218a, 218b may be put into an engaged state to ensure that there is an interconnection between the adjacent distal ends of beam members 202a, 202b which helps ensure the alignment of the beam members 202a, 202b, during the drying of the vehicle. As vehicle 212 progresses through the drying station, the PLC responding to signals from the electronic eye system can operate the beam movement apparatus to move the beam members 202a, 202b vertically up and/or down to follow the profile of the exterior surface of the vehicle. Additionally, the beam member rotation apparatus may also be activated to adjust the rotational positions of the beam members 202a, 202b about their respective axes X1, X2 to alter the orientation of the vents including vents 220a, 220b. FIG. 5 is a time elapsed view illustrating the changing orientations and vertical positions of vents 220a, 220b over time during the drying treatment of the vehicle 212 during normal operation as a vehicle moves through the drying station.

When it is desired or required for the beam members 202a, 202b to be moved to the vehicle release positions shown in solid lines in FIG. 2, the beam connectors 218a, 218b may be placed into a disengaged state by a signal from the PLC 299, thus releasing the interconnection between the distal ends of beam members 202a, 202b. Additionally, once the beam connectors 218a, 218b are disengaged, the beam member rotation apparatus may, in response to a signal from the PLC, be activated to rotate the beam members 202a, 202b about the hinges 210a, 210b. Similarly, when it is desired or required for the beam members 202a, 202b to be rotated to the operational positions, the beam member rotation apparatus may, in response to a signal from the PLC 299, be activated to rotate the beam members 202a, 202b about the hinges 210a, 210b. Once in the operational positions, the beam connectors 218a, 218b, may be placed into an engaged state by a signal from the PLC 299, thus engaging the interconnection between the distal ends of beam members 202a, 202b.

Figure 3:
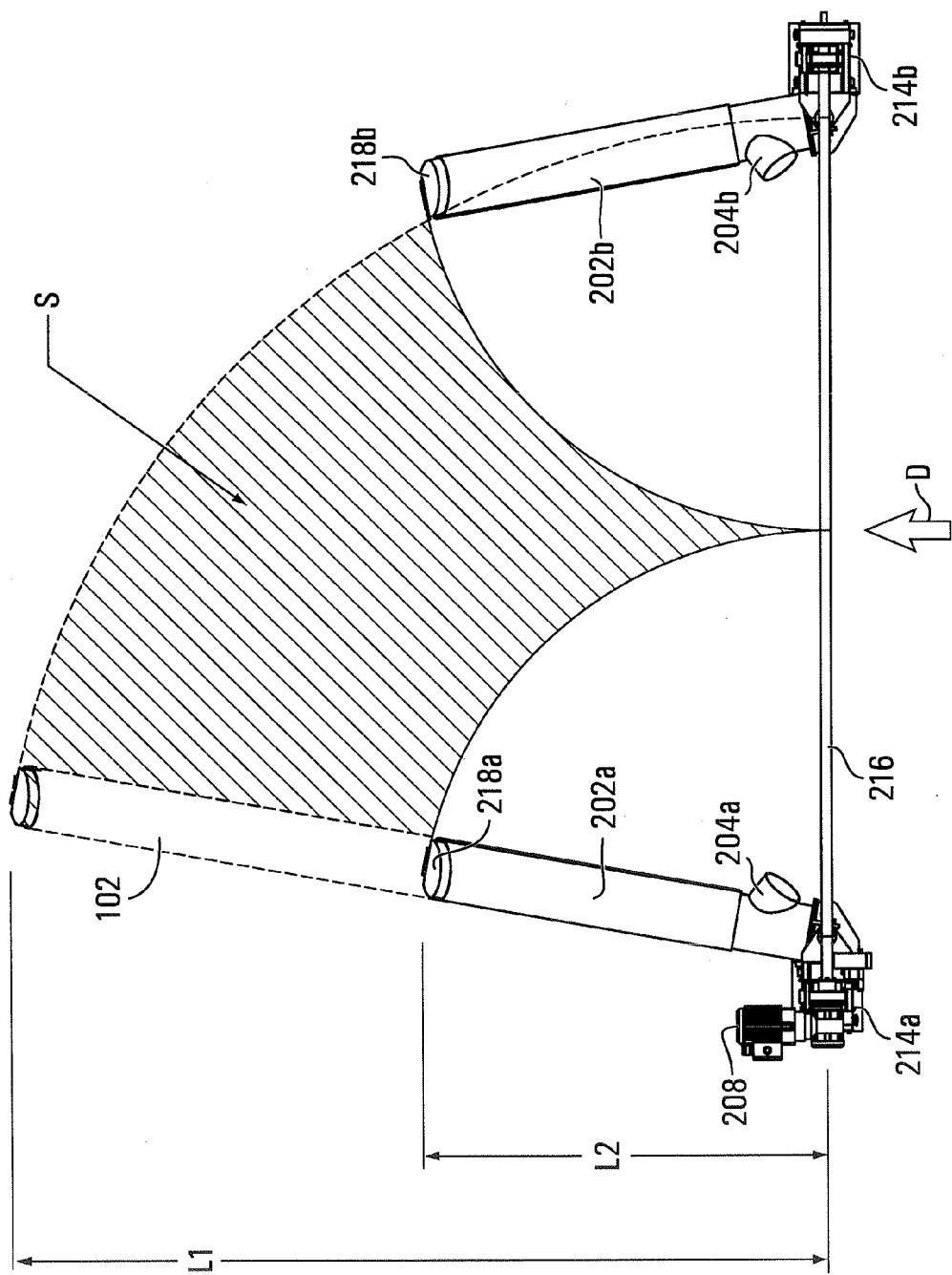
FIG. 3 is a top plan view illustrating some differences between the beam systems of FIGS. 1 and 2.

With reference to FIG. 3, a comparison both of the additional floor space required to situate a beam system 100 compared to beam system 200 is illustrated. FIG. 3 also illustrates the additional length required in a drying station to situate beam system 100 compared to beam system 200. The result of utilizing beam system 200 instead of beam system 100 is evident from FIG. 2. The savings in floor space and length of the drying station is of particular advantage in certain locations where space for car wash systems is limited.

With reference now to FIGS. 6 to 9, a drying station generally designated 301 is illustrated that forms part of a vehicle wash system. Drying station 301 may be positioned at or near to the end of a vehicle wash system and may be used to dry vehicle 312 that moves through the drying station.

Vehicle drying station 301 may include a pair of beam systems 300 and 400 each of which may be constructed substantially the same as beam system 200 described above. In overview, beam system 300 may be positioned "downstream" from beam system 400 and the operation of beam systems 300 and 400 may be controlled by a common PLC 900. PLC 900 may be for example a model CP1L-M40DR-D made by Omron Corporation. As described above in greater detail, beam system 300, like beam system 200, may include beam members 302a, 302b supported by support blocks 326a, 326b, on support posts 314a, 314b, respectively. Beam members 302a, 302b may have lower vents 320a, 320b respectively and corresponding intake vents 304a, 304b. Beam members 302a, 302b may also have beam connectors 318a, 318b. Likewise, beam system 400, like beam system 200, may include beam members 402a, 402b supported by support blocks 426a, 426b on support posts 414a, 414b, respectively. Beam members 402a, 402b may have lower vents 420a, 420b respectively and corresponding intake vents 404a, 404b. Beam members 402a, 402b may also have beam connectors 418a, 418b.

A pair of air supply systems 388a, 388b may also be provided to supply heated, pressurized air to the vents 320a, 320b, 420a, 420b. Air supply system 388a may include an air blower 390a which may for example be a model TECH21 made by MacNeil Wash Systems. Air supply system 388a may also include an air intake duct 392a in air communication between the outside air and the intake of blower 390a. An outlet of blower 390a is attached to an exhaust duct that provides communication of pressurized air between the blower 390a and connecting hoses 396a, 396b. Connecting hose 396a provides for communication of pressurized air from outlet duct 394a to intake vent 304a of beam member 302a. Similarly, connecting hose 397a provides for communication of pressurized air from outlet duct 394a to intake vent 304a of beam member 402a.

On the transversely opposite side of drying station 301, air supply system 388b may also include an air intake duct 392b in air communication between the outside air and the intake of blower 390b. An outlet of blower 390a is attached to an outlet duct that provides communication of pressurized air between the blower 390b and connecting hoses 396b, 397b. Connecting hose 396b provides for communication of pressurized air from outlet duct 394b to intake vent 304b of beam member 302b. Similarly, connecting hose 397b provides for communication of pressurized air from outlet duct 394b to intake vent 304b of beam member 402b. Side nozzles 450a, and 450b and associated ducts leading from the air blowers may also be provided for drying the side of the vehicle 312.

As described above in relation to beam system 200, each of beam system 300 and 400 may have electronic eye systems that enable PLC 900 to control the vertical positions of beam members 302a, 302b and beam members 402a, 402b, respectively, by operating the support block drive apparatuses associated therewith. Also, as referenced above in relation of system 200, through control of air cylinders (not shown) by PLC 900 associated with beam members 302a, 302b and beam members 402a, 402b the vents on those beams may have their angular positions altered. Therefore, beam systems 300 and 400 can independently follow the contour of the exterior surfaces of vehicle 312 during normal drying operation, under the control of PLC 900 as the vehicle moves through the drying station.

PLC 900 can also in response to signals corresponding to for example a system alarm state and/or a system operational state operate the respective beam member rotation apparatus associated with beam members 302a, 302b and beam member rotation apparatus associated with beam members 402a, 402b, such that both sets of beam members may be moved, preferably together in synchronized movement, between the operational positions and the vehicle release positions as described above in relation to beam system 200.

In the beam systems 200, 300 and 400 as described above, the beam systems were employed in the drying station of a car wash system. However, similar beam systems may be employed in one or more of the other treatment stations in a car wash system such as by way of example only the treatment stations associated with (i) applying a pre-soaking liquid chemical to the vehicle typically consisting of a mixture of water and soap/detergent to start to loosen the dirt; (ii) applying additional soap and water and engaging brushes/cleaning pads with, and/or the directing high pressure fluid streams onto, the exterior of the vehicle to remove the dirt; (iii) optionally applying other liquid such as waxes, undercoating fluids, tire cleaning and finishing liquids; (iv) rinsing the exterior surfaces by directing high pressure streams of clean water onto the vehicle exterior surfaces to remove residue left after the cleaning step.

For example beam systems similar to beam systems 200, 300 and 400 may be utilized to apply liquids to the exterior surfaces of a vehicle at a treatment station.

In FIGS. 10 to 14, a beam system 500 is illustrated that may form part of a pre-soak chemical application station in a car wash system. Beam system 500 may have a pair of beam members 502a, 502b, each of which may be mounted to a support frame generally designated as 506. Support frame 506 may include a first support post 514a separated transversely from, but longitudinally aligned with, a second support post 514b. Beam member 502a may be mounted for vertical movement on support post 514a; likewise beam member 502b may be mounted for vertical movement on support post 514b.

Beam member 502a may be mounted at one end to support frame 206 with a support block 526a. Support block 526a may be comprised of a plurality of plates surrounding the support post 514a. Support block 526a may be mounted around post 514a for vertical sliding movement relative to post 514a. Drive belt 524a may be wound about a drum 522a to raise support block 526a against gravity, and unwound to lower the support block 526a. Likewise, beam member 202b may be mounted at one end to support frame 206 with a support block 226b. Support block 226b may be comprised of a plurality of plates surrounding the support post 214b. Support block 226b may be mounted around post 214b for vertical sliding movement relative to post 214b.

As shown in detail in FIG. 10A, beam member 502b may be attached to support block 526b at a hinge 510b that is attached to the support block 526b. Likewise, beam member 502a may be attached to support block 526a at a hinge 510a that is formed like hinge 510b. A support bracket 510b is provided for a 3-position air cylinder 528b. By way of example only, air cylinder 528b may be a model CD02A32-50DM made by SMC. Air cylinder 528b may be operable to rotate beam member 502b about a horizontal axis Y1. Air cylinder 528b may have a rod end 530b with a clevis 561. Support bracket 510b may be attached to and extend below a separate plate 575 that is hinged to support block 526b. The lower end of the cylinder may attach via a second clevis 563 to the lower end of bracket 510b. The beam 502b may pass through bearing blocks 567 on the hinged plate 575 and attach to a lever arm 563 which attaches to the rod end clevis 561. It will be noted that there is a vertically oriented cylindrical shape between support bracket 510b and support block 526b which is the vertical pivot axis Z1 of the hinge. The end face of the plate itself is visible between the base of the bearing blocks and the adjacent face of support block 526b. Collars may be provided that extend above and below the ends of 526b and may be plastic bushings to guide the block along the support post.

While not illustrated in FIGS. 10 to 14, beam members 502a and 502b may also pivot at hinges 510a and 510b respectively between the operational positions and vehicle release positions which are similar to those positions shown above in FIG. 2 directed to system 200.

Figure 10C:
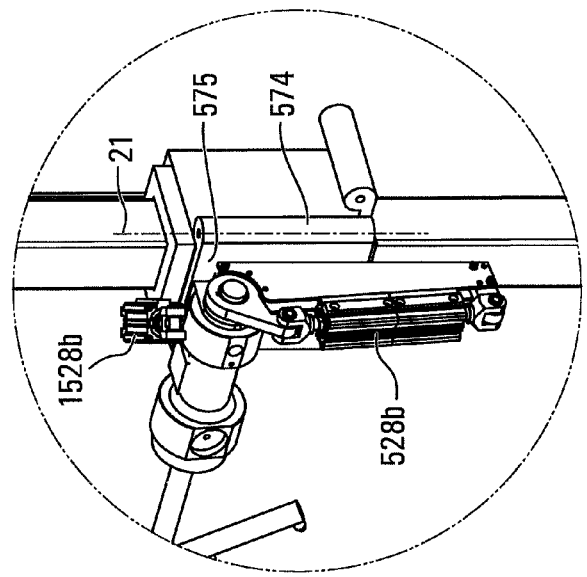
FIG. 10C is an enlarged view of the area marked C in FIG. 10B.
Figure 10B:
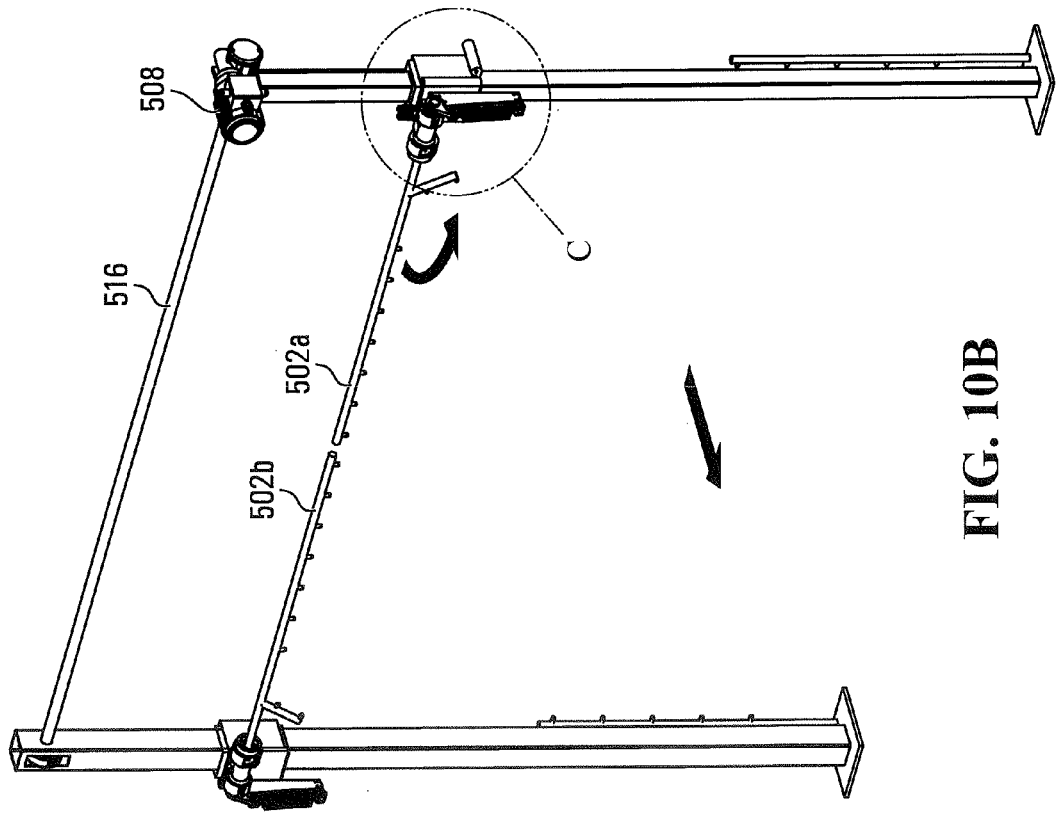
FIG. 10B is a view of a system like the system of FIG. 10, but with modifications to pivoting mechanism.
Figure 11A:
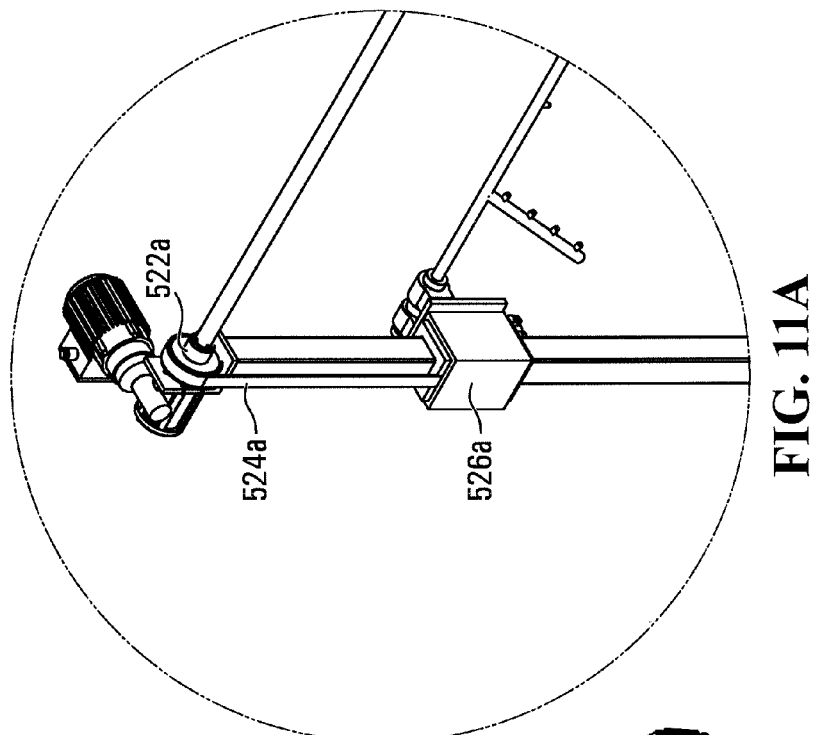
FIG. 11A is an enlarged view of the portion marked A in FIG. 11.
Figure 11:
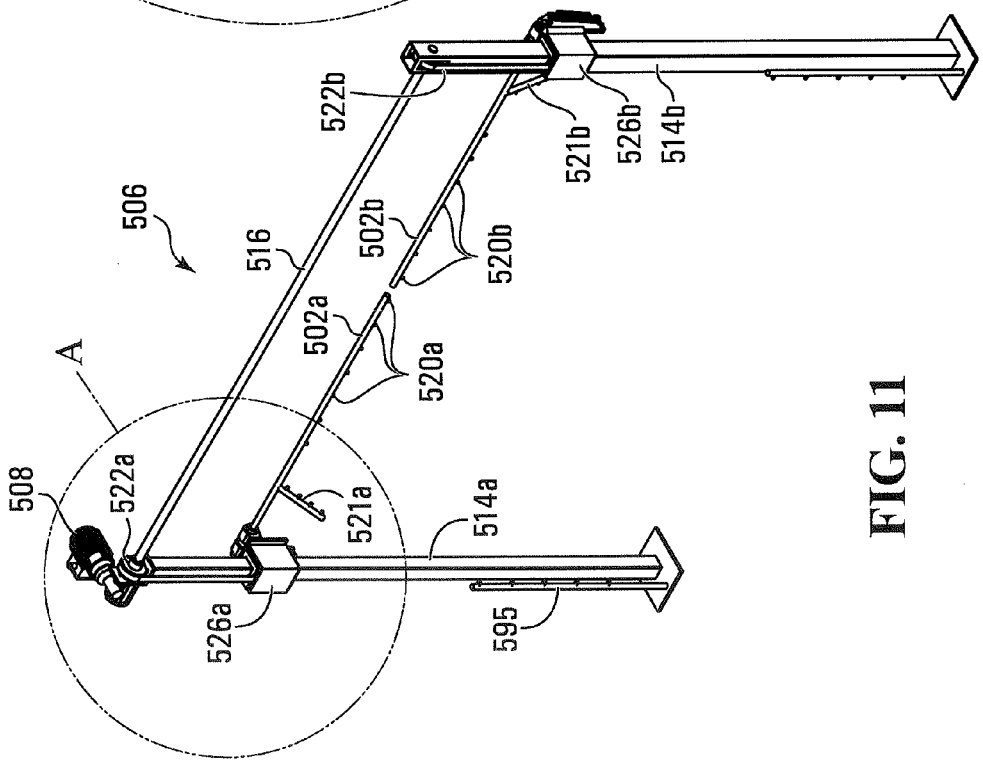
FIG. 11 is a front right side perspective view of the beam system of FIG. 10.

In some embodiments, and as described above in relation to beam system 200, a beam member rotation apparatus may be provided for each of beam members 510a, 510b that is operable to move both of the beam members between the operational positions and the release positions. As illustrated in FIGS. 10B and 10C, an additional pneumatic air cylinder 1528b may be provided to provide for the beam member rotation apparatus (a corresponding arrangement may also be provided in association with beam member 202b. Pneumatic cylinder 1528b may be a model C76F40-250T-R made by SMC. Cylinder 1528b may be attached at one end directly or indirectly to the support post and at the other end to plate 575. This cylinder may be provided with an internal spring bias that will cause the cylinder to be biased towards an extended position (so that the beam member is in a vehicle release position). Activation of cylinder 1528b may provide for a positive force that causes cylinder to retract overcoming the internal spring bias provided by the cylinder and causing the beam member to rotate about the vertical axis and move to the operational position shown in FIG. 10B. All cylinders 528a,b and 1528a,b may be provided with pressurized air from a pressurized air source and have associated solenoid valves that may be in communication with and controlled by the PLC 599.

While not shown in FIGS. 10 to 14, at the distal end of each beam member 502a, 502b, beam connectors like beam connectors 218a, 218b described above may be provided. Beam connectors may be used with or without the beam rotation apparatus referred to above. Beam connectors may be operable to interconnect with, and disconnect from, each other to provide a releasable connection between the distal ends of the beam members 502a, 502b. The operation of beam connectors 518a, 518b may also be controlled by a PLC 599 like PLC 199 (only shown in FIG. 12A. PLC 599 may be a model CP1L-M40DR-D made by Omron Corporation.

Motor 508, which may be an electric motor like motor 208 (model SCAQ26-QH80M4U made by Siemens Canada Limited) may be mounted to post 514a of support frame 506 and may be configured and be operable to drive a support block drive mechanism. Support block drive mechanism may include upper rotating drums 522a, 522b, and a transversely oriented drive rod 516. Drive rod 516 may be interconnected at ends to drum 522a and drum 522b. Drive belt 524a is connected to support block 526a and drive belt 524b is connected to support block 526b. Drive belt 524a may be wound about drum 522a to raise support block 526a against gravity, and unwound to lower the support block 526a. Similarly, drive belt 524b may be wound about a drum 522b to raise support block 526b against gravity, and unwound to lower the support block 526b.

Motor 508 is operatively connected to drive rod 516 to rotate drive rod 516 in both directions. Thus, operation of motor 508 may cause drive rod 516 to rotate which may cause drums t522a, 522b to rotate causing drive belts 524a, 524b to move.

As support block 526a is attached to both drive belt 524a and beam member 502a, movement of drive belt 524a will cause support block support 526a on post 514a and beam member 502a attached to support block 526a to move vertically on support post 514a. Likewise, as support block 526b is attached to both drive belt 524b and beam member 502b, movement of drive belt 524b will cause support block support 526b on post 514b and beam member 502b attached to support block 526b to move vertically on support post 514a. The positioning of beam members 502a and 502b and their support blocks along with the drive mechanism for the support blocks may be configured so that they both move vertically up and down together and in vertical alignment on their respective support posts 514a, 514b.

Motor 508 may be controlled by PLC 599. Indeed, the operation of the entire treatment station may be controlled by PLC 599. Each beam member 502a, 502b may be configured as a hollow tube and have a plurality of nozzles 520a, 520b respectively in bottom surfaces of the hollow tubes. Additionally an angled tube extension is provided in each beam member 502a, 502b each having a set of nozzles 521a, 521b that are in fluid communication with the source of pressurized fluid. Nozzles 595 in FIG. 11 may be provided and also controlled by PLC 599 to spray the sides of the vehicle 512. Fluid intake ducts 504a, 504b may be provided in beam members 502a, 502b respectively. Pressurized fluid may be supplied from a source such a fluid pump interconnected at a pump intake to a fluid supply line/fluid tank (not shown in FIGS. 10 to 14), into the interior of the hollow tube of beam members 502a, 502b. As each of the beam members 502a, 502b may be mounted for rotation about their respective longitudinal axis, the rotational positions of nozzles 520a of beam member 502a and the rotational positions of nozzles 520b of beam member 902b may be adjusted by the rotational drive mechanism. PLC 599 can adjust the orientation of the nozzles depending upon where the vehicle is in a longitudinal position relative to the beam members 502a, 502b, as described above in relation to systems 200 and 300.

A sensor and movement control system may be provided that enables each of the beam members 502a, 502b, to closely track and follow the profile/contour of the exterior surfaces of the vehicle 512 as the surface position changes so as to maintain the beam members at a specific distance from the exterior surfaces, or at least within a range of distances separated from the exterior surfaces. An example of a sensor system that might be employed as part of such a system is an electronic eye system that is mounted to the beam members. The electronic eye system may be like that described above in systems 200 and 300 and may provide a transverse electronic beam that is vertically, and possibly also longitudinally, separated from the beam members 502a, 502b, and the devices and vents supported thereon. A photo-source and photo-detector may be configured in a circuit to provide the electronic eye, such that a beam may be transmitted by the photo-source and received by the photo-detector, as is known and as is described above.

As with systems 200 and 300, various devices/systems may be used to detect that there is a problem with the treatment system and trigger the PLC 599 to respond to move the beam members 502a, 502b from the operational positions to the vehicle release positions. By way of example only, limit switches at the beam hinge points or at the beam couplings can be provided to indicate some kind of initial departure of the beam members from the operative positions. The PLC 599 may also respond to a timer to detect failure of the positioning beam member positioning system to respond to the interruption of the photo eye(s). PLC 599 may also respond to signals emitted from detectors in the system that there has been a system power failure and/or loss of pressurized fluid supply, or from a pressure sensor to detect the absence of the delivered fluid. A cushion device such as disclosed in U.S. Pat. No. 4,946,513 issued to Del Prato et. al, on Aug. 7, 1990 may also be used to provide a signal to PLC 599 to activate the beam rotation system.

In some beam release systems, the beam members may be moved from the operational positions to the vehicle release positions other than when responding to a system problem or alarm signal. By way of example only, the beam members may be moved to the vehicle release positions when the PLC 599 receives a signal from a sensor that detects when a treatment is over or when the PLC 599 program during operation reaches a stage indicating the treatment is over. The beam members may for example be also be moved from the operational positions to the vehicle release positions in response to signals from other parts of the wash system e.g. a signal indicating a critical failure of an external wash component or in response to a signal initiated by an operator of the vehicle wash system. In this way, the operator may initiate movement of the beam members from the operational positions to the vehicle release positions for servicing the wash equipment or cleaning the floor in a station such as the pre-soak station.

In operation, pressurized fluid may be supplied through intake ducts 504a, 504b into the beam members 502a, 502b. The pressurized air may flow through the hollow tube of beam members 502a, 502b, and then be directed in streams out of the beam members through the nozzles in beam members 502a, 502b including nozzles 520a, 520b, onto the exterior surface of a vehicle 512 to apply the chemical pre-soak liquid thereon.

Vehicle 512 may be moved through the pre-soak station and during normal operation, the PLC 599 receiving signals from the electronic eye system, may operate the support block movement apparatus to control the vertical position of beam members 502a, 502b and the orientation of the nozzles including vents 520a, 520b. The beam members 502a, 502b, may during the treatment of the vehicle be in their operational positions shown in FIGS. 10 to 14. When positioned in the operational positions beam connectors may be put into an engaged state to ensure that there is an interconnection between the adjacent distal ends of beam members which helps ensure the alignment of the beam members 502a, 502b, during the pre-soaking treatment of the vehicle. As vehicle 512 progresses through the drying station, the PLC 599 responding to signals from the electronic eye system can operate the beam movement apparatus to move the beam members 502a, 502b vertically up and/or down to follow the profile of the exterior surface of the vehicle. Additionally, the beam member rotation apparatus may also be activated to adjust the rotational positions of the beam members 502a, 502b about their respective axes to alter the orientation of the vents including nozzles 520a, 520b.

When it is desired or required for the beam members 502a, 502b to be rotated to the vehicle release positions shown, similar to the positions of beam members 202a, 202b, in solid lines in FIG. 2, the beam connectors may be placed into a disengaged state by a signal from the PLC 599, thus releasing the interconnection between the distal ends of beam members 502a, 502b. Additionally, the beam member rotation apparatus may, in response to a signal from the PLC, be activated to rotate the beam members 202a, 202b about the hinges 510a, 510b. Similarly, when it is desired or required for the beam members 502a, 502b to be rotated to the operational positions shown in FIGS. 10 to 14, the beam member rotation apparatus may, in response to a signal from the PLC 599, be activated to rotate the beam members 202a, 202b about the hinges 510a, 510b. Once in the operational positions, the beam connectors may be placed into a engaged state by a signal from the PLC 599, thus engaging the interconnection between the distal ends of beam members 502a, 502b.

It will be appreciated that if several treatment stations in a car wash system that utilize beam systems, select beam systems that are like or similar to beam systems 200, 300, 400 and 500 as described above, there can be a significant reduction in the overall floor space and length associated with the car wash system.

Although not specifically described in detail herein, suitable modifications may be made to the embodiments described by persons skilled in the art depending on the type of wash facility, and otherwise, being used for a particular application. Of course, the foregoing embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed element.

The invention claimed is:

1. A vehicle wash system comprising:
   a vehicle path for movement of a vehicle;
   a support frame;
   first and second beam members mounted to said support frame on opposite sides of said vehicle path, said first and second beam members extending generally horizontally, and said first and second beam members each having associated therewith a vehicle treatment apparatus, said vehicle treatment apparatus of each of said first and second beam members extending generally horizontally along said respective first and second beam members and said vehicle treatment apparatus of each of said first and second beam members being oriented and operable to treat an upward facing surface of a vehicle;
   a vertical drive mechanism associated with each of said first and second beam members to move said beam members vertically along said support frame;
   a pivot drive mechanism associated with each of said first and second beam members to pivot said beam members from (a) operational positions wherein first and second beam members extend toward one another above said vehicle path so that the vehicle may pass along said vehicle path under both of said first and second beam members, and said treatment apparatus is operable to apply a treatment to the vehicle passing under said beam members on said vehicle path to (b) vehicle release positions wherein said beam members do not extend across said vehicle path.

2. A system as claimed in claim 1 wherein said first and second beam members are mounted for vertical and horizontal movement relative to said support frame and further comprising a drive mechanism operable to move said first and second beam members vertically and horizontally relative to said support frame.

3. A system as claimed in claim 1 wherein said beam pivot drive mechanism is operable to provide a positive force to maintain said first beam member and said second beam member in said operational positions.

4. A system as claimed in claim 1 wherein when said first and second beam members are both in said operational positions, said first and second beam members are substantially aligned along a common transverse axis.

5. A system as claimed in claim 1 wherein said treatment apparatus comprises (i) at least one pressurized air conduit associated with each of said first and second beam members, (ii) at least one outlet vent in communication with said air conduit and associated with each of said first and second beam members, each said at least one outlet vent configured to emit pressurized air onto a vehicle when said first and second beam members are in said operational positions and (iii) a source of pressurized air for supplying pressurized air to said pressurized air conduit.

6. A system as claimed in claim 1 wherein said treatment apparatus comprises (i) at least one pressurized fluid conduit associated with each of said first and second beam members, (ii) at least one outlet nozzle each associated with each of said first and second beam members, each said at least one outlet nozzle being in communication with said fluid conduit and being configured to emit pressurized fluid onto a vehicle when said first and second beam members are in said operational positions and (iii) a source of pressurized fluid for supplying pressurized air to said pressurized fluid conduit.

7. A system as claimed in claim 1 further comprising a releasable beam member connection mechanism for releasably connecting said first and second beam members together to assist in maintaining said first and second beam members in said operational positions while said treatment apparatus is applying a treatment to said vehicle.

8. A system as claimed in claim 7, wherein said connection mechanism comprises a first connection device at a distal end of said first beam member and a second connection device at a distal end of said second beam member, said first and second connection devices operable to releasably engage with each other.

9. A system as claimed in claim 1, wherein each of said first and second beam members is attached to a support block slidably mounted to said support frame.

10. A system as claimed in claim 9, wherein said vertical drive mechanism comprises a drive motor coupled to said support block to slide said support block upwardly or downwardly.

11. A system as claimed in claim 10, comprising a belt coupling said motor to said support block.

12. A system as claimed in claim 9, wherein each of said first and second beam members is attached to the respective support block by a hinge, and wherein said pivot drive mechanism is operable to pivot said beam members around said hinges.

13. A system as claimed in claim 12, wherein said pivot drive mechanism comprises a pneumatic cylinder.

14. A vehicle wash system comprising:
   a. a vehicle path for movement of a vehicle;
   b. a support frame;
   c. a first beam member mounted to said support frame and a second beam member mounted to said support frame, said first and second beam members being mounted to said support frames at locations transversely spaced from one another;

d. said first and second beam members each having associated therewith a vehicle treatment apparatus;
e. each of said first beam member and said second beam member being movable between (a) operational positions wherein first and second beam members extend toward one another above said vehicle path so that a vehicle may pass under said first and second beam members and said treatment apparatus is operable to apply a treatment to the vehicle passing under said beam members on said vehicle path and (b) vehicle release positions wherein said beam members do not extend across said vehicle path;
f. a releasable beam member connection mechanism being operable for releasably connecting said first and second beam members together to assist in maintaining said first and second beam members in said operational positions while said treatment apparatus is applying a treatment to said vehicle;
g. and wherein said releasable beam member connection mechanism comprises: a first connection device at a distal end of said first beam member; and a second connection device at a distal end of said second beam member, said first and second connection devices being operable to releasably engage with each other.

15. A vehicle treatment station for a vehicle wash system comprising:
a. a vehicle path for movement of a vehicle;
b. a support frame;
c. a first beam member mounted to said support frame;
d. a second beam member mounted to said support frame;
e. said first beam member and said second beam member extending from opposite transverse sides of said vehicle path;
f. said first and second beam members each having a distal end and said first and second members each having associated therewith a vehicle treatment apparatus, said vehicle treatment apparatus of each of said first and second beam members extending along a length of said first and second beam members and being oriented to extend over an upward facing surface of a vehicle when in operational positions and treat said upward facing surface as the vehicle passes under said beam members;
g. a vertical drive mechanism associated with each of said first and second beam members to move said beam members vertically along said support frame;
h. a pivot drive mechanism associated with each of said first and second beam members to pivot said beam members between (a) operational positions wherein first and second beam members are generally longitudinally oriented and extend toward one another above said vehicle path in directions generally perpendicular to said vehicle path so that the vehicle may pass under said beam members and (b) vehicle release positions wherein said beam members are generally longitudinally oriented in a direction that is generally parallel to said vehicle path.

16. A system as claimed in claim 15 wherein said pivot drive mechanism is operable to provide a positive force to maintain said first beam member and said second beam member in said operational positions.

17. A system as claimed in claim 16 wherein in said operational positions said first and second beam said first and second beam members are generally axially aligned in a transverse orientation, and wherein in said vehicle release positions said first and second beam are no longer generally axially aligned with each other and are generally oriented in a longitudinal direction.

18. A vehicle wash system comprising:
a. a vehicle path for movement of a vehicle;
b. a support frame;
c. a first beam member mounted to said support frame and a second beam member mounted to said support frame, said first and second beam members mounted to said support frame on opposite sides of said vehicle path;
d. said first and second beam members extending generally horizontally, and said first and second beam members each having associated therewith vehicle drying apparatus, said drying apparatus of each of said first and second beam members having at least one outlet vent extending generally horizontally along said respective first and second beam members, wherein air drying apparatus comprises (i) at least one pressurized air conduit associated with each of said first and second beam members, (ii) at least one outlet vent in communication with said air conduit and associated with each of said first and second beam members, each said at least one outlet vent configured to emit pressurized air onto an upward facing surface of a vehicle when said first and second beam members are in said operational positions and (iii) a source of pressurized air for supplying pressurized air to said pressurized air conduit.
e. a vertical drive mechanism associated with each of said first and second beam members to move said beam members vertically along said support frame;
f. a pivot drive mechanism associated with each of said first and second beam members to move said beam members between (a) operational positions wherein first and second beam members extend toward one another above said vehicle path so that the vehicle may pass under said first and second beam members and each vehicle drying apparatus is operable to emit one or more streams of air on to an upward facing surface of the vehicle passing under said beam members on said vehicle path and (b) vehicle release positions wherein said beam members do not extend across said vehicle path.

19. A vehicle treatment station for a vehicle wash comprising:
a frame comprising:
first and second support members positioned on opposite sides of a vehicle path;
first and second beam members rotatably mounted to said first and second support members, respectively, and extending horizontally toward one another above said vehicle path in an operational position;
said frame surrounding said vehicle path so that a vehicle may pass between said first and second support members and beneath said first and second beam members;
a vehicle treatment apparatus extending along each one of said first and second beam members and operable to treat the vehicle passing under said first and second beam members along said vehicle path;
a vertical drive mechanism to move said first and second beam members vertically along said support frame;
a pivot drive mechanism to rotate said first and second beam members rotatable from said operational position to a vehicle release position wherein said beam members extend generally parallel to said vehicle path.

20. A vehicle treatment station for a vehicle wash system comprising:
a vehicle path for movement of a vehicle;
a support frame;
first and second beam members mounted to said support frame on opposite sides of said vehicle path;
a first vehicle treatment apparatus associated with and supported by said first beam member, and a second vehicle treatment apparatus associated with and supported by said second beam member, said first and second vehicle treatment apparatuses, in an operational position, extending horizontally toward one another spanning substantially the entire vehicle path so that a vehicle may pass thereunder and being oriented and operable to treat an upward facing surface of the vehicle;

a vertical drive mechanism to move said first and second beam members vertically along said support frame;

a pivot drive mechanism to rotate each of said first beam member and said second beam member to a vehicle release position wherein said beam members are generally parallel to said vehicle path.

21. A vehicle treatment station as claimed in claim 20, comprising a releasable beam member connection mechanism for releasably connecting said first and second beam members together to assist in maintaining said first and second beam members in said operational positions while said treatment apparatus is applying a treatment to the vehicle.

22. A system as claimed in claim 21, wherein said connection mechanism comprises a first connection device at a distal end of said first beam member and a second connection device at a distal end of said second beam member, said first and second connection devices operable to releasably engage with each other.

\* \* \* \* \*

UNITED STATES PATENT AND TRADEMARK OFFICE
CERTIFICATE OF CORRECTION

| | | |
|---|---|---|
| PATENT NO. | : 9,162,651 B2 | Page 1 of 1 |
| APPLICATION NO. | : 13/011143 | |
| DATED | : October 20, 2015 | |
| INVENTOR(S) | : Daniel J. MacNeil | |

It is certified that error appears in the above-identified patent and that said Letters Patent is hereby corrected as shown below:

IN THE CLAIMS

Column 18
Claim 19, line 57, replace "beam members rotatable from" with -- beam members from --

Signed and Sealed this
Twenty-ninth Day of March, 2016

Michelle K. Lee
*Director of the United States Patent and Trademark Office*